United States Patent
Thaker et al.

(10) Patent No.: US 7,526,660 B2
(45) Date of Patent: Apr. 28, 2009

(54) VOLTAGE SET POINT CONTROL SCHEME

(75) Inventors: Mahesh Natverlal Thaker, Moorpark, CA (US); Alain Chapuis, Morgan Hill, CA (US)

(73) Assignee: Power-One, Inc., Camarillo, CA (US)

( * ) Notice: Subject to any disclaimer, the term of this patent is extended or adjusted under 35 U.S.C. 154(b) by 308 days.

(21) Appl. No.: 11/281,973

(22) Filed: Nov. 16, 2005

(65) Prior Publication Data
US 2006/0069935 A1 Mar. 30, 2006

Related U.S. Application Data (63) Continuation of application No. 10/388,829, filed on Mar. 14, 2003, now Pat. No. 7,080,265.

(51) Int. Cl.
*G06F 1/26* (2006.01)
(52) U.S. Cl. .......................... 713/300; 363/74
(58) Field of Classification Search ................ 713/300, 713/310, 320, 321; 323/234, 241, 304; 363/15, 363/74
See application file for complete search history.

(56) References Cited

U.S. PATENT DOCUMENTS

| | | | |
|---|---|---|---|
| 429,581 | A | 6/1890 | Tan |
| 3,660,672 | A | 5/1972 | Berger et al. |
| 4,194,147 | A | 3/1980 | Payne et al. |
| 4,204,249 | A | 5/1980 | Dye et al. |
| 4,328,429 | A | 5/1982 | Kublick et al. |
| 4,335,445 | A | 6/1982 | Nercessian |
| 4,451,773 | A | 5/1984 | Papathomas et al. |
| 4,538,073 | A | 8/1985 | Freige et al. |
| 4,538,101 | A | 8/1985 | Shimpo et al. |
| 4,607,330 | A | 8/1986 | McMurray et al. |

(Continued)

FOREIGN PATENT DOCUMENTS

CN 2521825 11/2002

(Continued)

OTHER PUBLICATIONS

25 Watt DC-DC Converters, Melcher The Power Partners and Power-One Group of Companies, Industrial Environment, Apr. 4, 1999, DC-DC Converters<40 Watt, G Series, 16 Pages.

(Continued)

*Primary Examiner*—Thuan N Du
(74) *Attorney, Agent, or Firm*—O'Melveny & Myers LLP (57) ABSTRACT

A system and method is provided for determining a voltage output of a programmable power converter based on programming voltage data received from one of a variety of alternate sources. Specifically, in one embodiment of the present invention, a control unit is adapted to monitor a digital data serial interface, a digital data parallel interface, and an analog data interface to determine whether programming voltage data has been received. If programming voltage data has been received, the data is used to determine an output voltage for the programmable power converter. If more than one set of programming voltage data has been received, a determination is made as to which set of data takes priority. The selected set of data is then used to determine an output voltage for the programmable power converter.

15 Claims, 3 Drawing Sheets

U.S. PATENT DOCUMENTS

| | | | |
|---|---|---|---|
| 4,616,142 A | 10/1986 | Upadhyay et al. |
| 4,622,627 A | 11/1986 | Rodriguez et al. |
| 4,630,187 A | 12/1986 | Henze |
| 4,654,769 A | 3/1987 | Middlebrook |
| 4,677,566 A | 6/1987 | Whittaker et al. |
| 4,761,725 A | 8/1988 | Henze |
| 4,940,930 A | 7/1990 | Detweiler |
| 4,988,942 A | 1/1991 | Ekstrand |
| 5,004,972 A | 4/1991 | Roth |
| 5,053,920 A | 10/1991 | Staffiere et al. |
| 5,073,848 A | 12/1991 | Steigerwald et al. |
| 5,079,498 A | 1/1992 | Cleasby et al. |
| 5,117,430 A | 5/1992 | Berglund |
| 5,168,208 A | 12/1992 | Schultz et al. |
| 5,229,699 A | 7/1993 | Chu et al. |
| 5,270,904 A | 12/1993 | Gulczynski |
| 5,272,614 A | 12/1993 | Brunk et al. |
| 5,287,055 A | 2/1994 | Cini et al. |
| 5,349,523 A | 9/1994 | Inou et al. |
| 5,377,090 A | 12/1994 | Steigerwald |
| 5,398,029 A | 3/1995 | Toyama et al. |
| 5,426,425 A | 6/1995 | Conrad et al. |
| 5,481,140 A | 1/1996 | Maruyama et al. |
| 5,489,904 A | 2/1996 | Hadidi |
| 5,532,577 A | 7/1996 | Doluca |
| 5,627,460 A | 5/1997 | Bazinet et al. |
| 5,631,550 A | 5/1997 | Castro et al. |
| 5,646,509 A | 7/1997 | Berglund et al. |
| 5,675,480 A | 10/1997 | Stanford |
| 5,727,208 A | 3/1998 | Brown |
| 5,752,047 A | 5/1998 | Darty et al. |
| 5,815,018 A | 9/1998 | Soborski |
| 5,847,950 A | 12/1998 | Bhagwat |
| 5,870,296 A | 2/1999 | Schaffer |
| 5,872,984 A | 2/1999 | Berglund et al. |
| 5,874,912 A | 2/1999 | Hasegawa |
| 5,883,797 A | 3/1999 | Amaro et al. |
| 5,889,392 A | 3/1999 | Moore et al. |
| 5,892,933 A | 4/1999 | Voltz |
| 5,905,370 A | 5/1999 | Bryson |
| 5,917,719 A | 6/1999 | Hoffman et al. |
| 5,929,618 A | 7/1999 | Boylan et al. |
| 5,929,620 A | 7/1999 | Dobkin et al. |
| 5,935,252 A | 8/1999 | Berglund et al. |
| 5,943,227 A | 8/1999 | Bryson et al. |
| 5,946,495 A | 8/1999 | Scholhamer et al. |
| 5,990,669 A | 11/1999 | Brown |
| 5,994,885 A | 11/1999 | Wilcox et al. |
| 6,005,377 A | 12/1999 | Chen et al. |
| 6,021,059 A | 2/2000 | Kennedy |
| 6,055,163 A | 4/2000 | Wagner et al. |
| 6,057,607 A | 5/2000 | Rader, III et al. |
| 6,079,026 A | 6/2000 | Berglund et al. |
| 6,100,676 A | 8/2000 | Burstein et al. |
| 6,111,396 A | 8/2000 | Line et al. |
| 6,115,441 A | 9/2000 | Douglass et al. |
| 6,121,760 A | 9/2000 | Marshall et al. |
| 6,136,143 A | 10/2000 | Winter et al. |
| 6,137,280 A | 10/2000 | Ackermann et al. |
| 6,150,803 A | 11/2000 | Varga |
| 6,157,093 A | 12/2000 | Giannopoulos et al. |
| 6,157,182 A | 12/2000 | Tanaka et al. |
| 6,163,143 A | 12/2000 | Shimamori |
| 6,163,178 A | 12/2000 | Stark et al. |
| 6,170,062 B1 | 1/2001 | Henrie |
| 6,177,787 B1 | 1/2001 | Hobrecht |
| 6,181,029 B1 | 1/2001 | Berglund et al. |
| 6,191,566 B1 | 2/2001 | Petricek et al. |
| 6,194,883 B1 | 2/2001 | Shimamori |
| 6,198,261 B1 | 3/2001 | Schultz et al. |
| 6,199,130 B1 | 3/2001 | Berglund et al. |
| 6,208,127 B1 | 3/2001 | Doluca |
| 6,211,579 B1 | 4/2001 | Blair |
| 6,246,219 B1 | 6/2001 | Lynch et al. |
| 6,249,111 B1 | 6/2001 | Nguyen |
| 6,262,900 B1 | 7/2001 | Suntio |
| 6,288,595 B1 | 9/2001 | Hirakata et al. |
| 6,291,975 B1 | 9/2001 | Snodgrass |
| 6,294,954 B1 | 9/2001 | Melanson |
| 6,304,066 B1 | 10/2001 | Wilcox et al. |
| 6,304,823 B1 | 10/2001 | Smit et al. |
| 6,320,768 B1 | 11/2001 | Pham et al. |
| 6,351,108 B1 | 2/2002 | Burstein et al. |
| 6,355,990 B1 | 3/2002 | Mitchell |
| 6,366,069 B1 | 4/2002 | Nguyen et al. |
| 6,373,334 B1 | 4/2002 | Melanson |
| 6,385,024 B1 | 5/2002 | Olson |
| 6,392,577 B1 | 5/2002 | Swanson et al. |
| 6,396,169 B1 | 5/2002 | Voegeli et al. |
| 6,396,250 B1 | 5/2002 | Bridge |
| 6,400,127 B1 | 6/2002 | Giannopoulos |
| 6,411,071 B1 | 6/2002 | Schultz |
| 6,411,072 B1 | 6/2002 | Feldman |
| 6,421,259 B1 | 7/2002 | Brooks et al. |
| 6,429,630 B2 | 8/2002 | Pohlman et al. |
| 6,448,745 B1 | 9/2002 | Killat |
| 6,448,746 B1 | 9/2002 | Carlson |
| 6,456,044 B1 | 9/2002 | Darmawaskita |
| 6,465,909 B1 | 10/2002 | Soo et al. |
| 6,465,993 B1 | 10/2002 | Clarkin et al. |
| 6,469,478 B1 | 10/2002 | Curtin |
| 6,469,484 B2 | 10/2002 | L'Hermite et al. |
| 6,476,589 B2 | 11/2002 | Umminger et al. |
| 6,556,158 B2 | 4/2003 | Steensgaard-Madsen |
| 6,563,294 B2 | 5/2003 | Duffy et al. |
| 6,583,608 B2 | 6/2003 | Zafarana et al. |
| 6,590,369 B2 | 7/2003 | Burstein et al. |
| 6,608,402 B2 | 8/2003 | Soo et al. |
| 6,614,612 B1 | 9/2003 | Menegoli et al. |
| 6,621,259 B2 | 9/2003 | Jones et al. |
| 6,683,494 B2 | 1/2004 | Stanley |
| 6,686,831 B2 | 2/2004 | Cook |
| 6,693,811 B1 | 2/2004 | Bowman et al. |
| 6,717,389 B1 | 4/2004 | Johnson |
| 6,731,023 B2 | 5/2004 | Rothleitner et al. |
| 6,744,243 B2 | 6/2004 | Daniels et al. |
| 6,771,052 B2 | 8/2004 | Ostojic |
| 6,778,414 B2 | 8/2004 | Chang et al. |
| 6,788,033 B2 | 9/2004 | Vinciarelli |
| 6,788,035 B2 | 9/2004 | Bassett et al. |
| 6,791,298 B2 | 9/2004 | Shenai et al. |
| 6,791,302 B2 | 9/2004 | Tang et al. |
| 6,791,368 B2 | 9/2004 | Tzeng et al. |
| 6,795,009 B2 | 9/2004 | Duffy et al. |
| 6,801,027 B2 | 10/2004 | Hann et al. |
| 6,807,070 B2 | 10/2004 | Ribarich |
| 6,816,758 B2 | 11/2004 | Maxwell, Jr. et al. |
| 6,819,537 B2 | 11/2004 | Pohlman et al. |
| 6,828,765 B2 | 12/2004 | Schultz et al. |
| 6,829,547 B2 | 12/2004 | Law et al. |
| 6,833,691 B2 | 12/2004 | Chapuis |
| 6,850,046 B2 | 2/2005 | Chapuis |
| 6,850,049 B2 | 2/2005 | Kono |
| 6,850,426 B2 | 2/2005 | Kojori et al. |
| 6,853,169 B2 | 2/2005 | Burstein et al. |
| 6,853,174 B2 | 2/2005 | Inn |
| 6,888,339 B1 | 5/2005 | Travaglini et al. |
| 6,903,949 B2 | 6/2005 | Ribarich |
| 6,911,808 B1 | 6/2005 | Shimamori |
| 6,915,440 B2 | 7/2005 | Berglund et al. |
| 6,917,186 B2 | 7/2005 | Klippel et al. |
| 6,928,560 B1 | 8/2005 | Fell, III et al. |
| 6,933,709 B2 | 8/2005 | Chapuis |
| 6,933,711 B2 | 8/2005 | Sutardja et al. |

| | | | |
|---|---|---|---|
| 6,936,999 B2 | 8/2005 | Chapuis | |
| 6,947,273 B2 | 9/2005 | Bassett et al. | |
| 6,963,190 B2 | 11/2005 | Asanuma et al. | |
| 6,965,220 B2 | 11/2005 | Kernahan et al. | |
| 6,965,502 B2 | 11/2005 | Duffy et al. | |
| 6,975,494 B2 | 12/2005 | Tang et al. | |
| 6,977,492 B2 | 12/2005 | Sutardja et al. | |
| 7,007,176 B2 | 2/2006 | Goodfellow et al. | |
| 7,023,672 B2 | 4/2006 | Goodfellow et al. | |
| 7,068,021 B2 | 6/2006 | Chapuis | |
| 7,080,265 B2 | 7/2006 | Thaker et al. | |
| 7,141,956 B2 | 11/2006 | Chapuis | |
| 7,266,709 B2 | 9/2007 | Chapuis et al. | |
| 7,394,445 B2 | 7/2008 | Chapuis et al. | |
| 2001/0033152 A1 | 10/2001 | Pohlman et al. | |
| 2001/0052862 A1 | 12/2001 | Roelofs | |
| 2002/0070718 A1 | 6/2002 | Rose | |
| 2002/0073347 A1 | 6/2002 | Zafarana et al. | |
| 2002/0075710 A1 | 6/2002 | Lin et al. | |
| 2002/0104031 A1 | 8/2002 | Tomlinson et al. | |
| 2002/0105227 A1 | 8/2002 | Nerone et al. | |
| 2002/0144163 A1 | 10/2002 | Goodfellow et al. | |
| 2003/0006650 A1 | 1/2003 | Tang et al. | |
| 2003/0067404 A1 | 4/2003 | Ruha et al. | |
| 2003/0122429 A1 | 7/2003 | Zhang et al. | |
| 2003/0137912 A1 | 7/2003 | Ogura | |
| 2003/0142513 A1 | 7/2003 | Vinciarelli | |
| 2003/0201761 A1 | 10/2003 | Harris | |
| 2004/0027101 A1 | 2/2004 | Vinciarelli | |
| 2004/0080044 A1 | 4/2004 | Moriyama et al. | |
| 2004/0090219 A1 | 5/2004 | Chapuis | |
| 2004/0093533 A1 | 5/2004 | Chapuis et al. | |
| 2004/0123164 A1 | 6/2004 | Chapuis et al. | |
| 2004/0123167 A1 | 6/2004 | Chapuis | |
| 2004/0135560 A1 | 7/2004 | Kernahan et al. | |
| 2004/0155640 A1 | 8/2004 | Sutardja et al. | |
| 2004/0174147 A1 | 9/2004 | Vinciarelli | |
| 2004/0178780 A1 | 9/2004 | Chapuis | |
| 2004/0189271 A1 | 9/2004 | Hansson et al. | |
| 2004/0201279 A1 | 10/2004 | Templeton | |
| 2004/0225811 A1 | 11/2004 | Fosler | |
| 2004/0246754 A1 | 12/2004 | Chapuis | |
| 2005/0093594 A1 | 5/2005 | Kim et al. | |
| 2005/0117376 A1 | 6/2005 | Wilson | |
| 2005/0146312 A1 | 7/2005 | Kenny et al. | |
| 2005/0200344 A1 | 9/2005 | Chapuis | |
| 2005/0289373 A1 | 12/2005 | Chapuis et al. | |
| 2006/0022656 A1 | 2/2006 | Leung et al. | |
| 2006/0149396 A1 | 7/2006 | Templeton | |
| 2006/0174145 A1 | 8/2006 | Chapuis et al. | |
| 2006/0244570 A1 | 11/2006 | Leung et al. | |
| 2006/0250120 A1 | 11/2006 | King | |

FOREIGN PATENT DOCUMENTS

| | | |
|---|---|---|
| EP | 0255258 | 2/1988 |
| EP | 315366 | 5/1989 |
| EP | 0401562 | 12/1990 |
| EP | 0660487 | 6/1995 |
| EP | 0875994 | 11/1998 |
| EP | 0877468 | 11/1998 |
| EP | 0997825 | 5/2000 |
| GB | 2377094 | 12/2002 |
| JP | 60-244111 | 12/1985 |
| JP | 1185329 | 3/1999 |
| KR | 200284495 | 8/2002 |
| SU | 1359874 | 12/1985 |
| SU | 1814177 | 5/1993 |
| WO | WO93/19415 | 9/1993 |
| WO | WO 01/22585 A1 | 3/2001 |
| WO | WO 02/31943 | 4/2002 |
| WO | WO02/31943 | 4/2002 |
| WO | WO02/31951 | 4/2002 |
| WO | WO02/50690 | 6/2002 |
| WO | WO02/063688 | 8/2002 |
| WO | WO 03/030369 | 4/2003 |

OTHER PUBLICATIONS

48V Programmable Hot Swap Sequencing Power Controller, Summit Microelectronics, Inc., Oct. 30, 2002, SMH4804, 41 Pages.

Advanced Configuration and Power Interface Specification, Intel Corporation, Microsoft Corporation, Toshiba Corp, Feb. 2, 1999, Revision 1.0b, 387 Pages.

Advantages of Microcontrollers in DC-DC Converters, Galaxy Power, Jan. 1, 2003 IBM Symposium, Real Solutions for Distributed Power, 8 Pages.

Architecture and IC implementation of a digital VRM controller, Jinwen, Xiao et al, 32nd Annual IEEE Power Electronics Specialists Conference. PESC 2001. Conference Proceedings. Vancouver, Canada, Jun. 17-21, 2001, Annual Power Electronics Specialists Conference, New York, NY : IEEE, US, vol. vol. 1 of 4. Conf. 32, Jun. 17, 2001, pp. 38-47, XP010559121 ISBN: 0-7803-7067-8, figure 7.

Characteristics of Automated Power System Monitoring & Management Platforms, Hawkins, John M.; Telepower Australia Pty Ltd, Jan. 1, 2000, telepower@telepower.com.au, IEEE, Intelec, 5 Pages.

Chemistry-Independent Battery Chargers, Maxim Integrated Products, Dec. 1, 2002, 19-1158, Rev 1, MAX1647/MAX1648, 25 Pages.

Current-Fed Multiple-Output Power Conversion, Seamus O'Driscoll; John G. Hayes and Michael G. Egan; Artesyn Technologies; Dept. of Electrical Engineering, University College Cork, Ireland, Dec. 3, 2003, 7 pages.

Digital Multiphase Power from Primarion and Intersil Changing the Landscape of Processor Power, Primarion, Inc., White Paper, Sep. 12, 2002, 6 pages.

Dual 550kHz Synchronous 2-Phase Switching Regulator Controller, Linear Technology, Jan. 1, 1998, LTC1702, 36 Pages.

Dual Smart Card Interface TDA8020HL, Philips Semiconductors, Integrated Circuits, Data Sheet, Feb. 24, 2001, I2C Bus,TDA8020HL, Objective Specification v4.2 Supersedes data of Jan. 2001 File under Integrated Circuits, ICXX, 22 Pages.

Dual Smart Card Interface TDA8020HL/C2, Christophe Chausset, Philips Semiconductors, May 20, 2003, Application Note, TDA8020HL/C2, AN10232, 28 Pages.

High Efficiency Synchronous Step-Down Switching Regulator, Linear Technology, Jan. 1, 1998, LTC1735, 33 Pages.

High Efficiency, 2-Phase Synchronous Step-Down Switching Regulators, Linear Technology, Jan. 1, 1998, LTC1628/LTC1628-PG, 32 Pages.

High-frequency digital controller IC for DC/DC converters, Patella B J et al; APEC 2002. 17th. Annual IEEE Applied Power Electronics Conference and Exposition. Dallas, TX, Mar. 10-14, 2002, Annual Applied Power Electronics Conference, New York, NY : IEEE, US, vol., vol. 2 of 2. Conf. 17, Mar. 10, 2002, pp. 374-380, XP010582947, ISBN: 0-7803-7404-5, p. 375, right-hand column; figure 3.

Highly Programmable Voltage Supply Controller and Supervisory Circuit, Summit Microelectronics, Inc., Jun. 7, 2001, SMS44, Preliminary, 19 Pages.

Infinite Impulse Response, Wikipedia, http://en.wikipedia.org/wiki/IIR, May 2, 2006, pp. 1-4.

In-Situ Transfer Function Analysis, 2006 Digital Power Forum Presentation; Mark Hagen, Texas Instruments Digital Power Group, Jul. 1, 2006.

In-System Network Analyzer, 2006 Digital Power Forum Prensentaiton, Silicon Laboratories, Jul. 7, 2006.

Low Voltage Study Workshop Report, Charles E. Mullett; Lou Pechi; PSMA, Power Sources Manufacturers Association, The Multinational Power Electronics Association, Jan. 1, 2001, 150 Pages.

Memorandum Opinion and Order, *Power One v Artesyn Technologies, Inc.*; Civil Action 2:05cv463, Mar. 22, 2007.

Microprocessor Core Supply Voltage Set by I2C Bus Without VID Lines—Design Note 279, Mark Gurries; Linear Technology—Design Notes, Jan. 7, 2002, 2 Pages.

NEBS Compliant Board Level Power System, Thomas J. DeLurio, Mikhail Guz and John Ng; Summit Microelectronics, Power One, Oct. 20, 2002, 7 Pages.

New Digital Power Delivery Architecture, Bob Carroll, Primarion, Sep. 1, 2004, 7 Pages.

Operating and Service Manual SQ Series, DC Power Supplies, Magna-Power Electronics, Inc., Dec. 16, 2002, 48 pgs.

Power Management for Communications: Corporate Overview, Summit Microelectronics Inc., Oct. 1, 2002, 213 Pages.

Power Management for Communications: Product Information, Summit Microelectronics, Inc., Jan. 23, 2001, 168 Pages, http://www.summitmicro.com.

Power Semiconductors and Power Supplies—The Building Blocks of the Digital Power Revolution, Todd Cooper and Holman Harvey; Stephens, Inc. Investment Bankers, Sep. 1, 2000, 132 Pages.

Programmable Four-Channel Step-Down DC/DC Converter, Texas Instruments, Oct. 1, 2001, TPS54900, 16 Pages.

Quad Tracking Power Supply Manager, Summit Microelectronics, Inc., Mar. 4, 2002, SMT4004, 35 Pages.

Simple digital hardware to control a PFC converter, A, Zumel P et al; IECON'01. Proceedings of the 27th. Annual Conference of the IEEE Industrial Electronics Society. Denver, CO, Nov. 29-Dec. 2, 2001, Annual Conference of the IEEE Industrial Electronics Society, New York, NY: IEEE, US, v01. vol. 1 of 3. Conf. 27, Nov. 29, 2001, pp. 943-948, XP010572905 ISBN: 0-7803-7108-9, paragraph [IIIC].

Single-Inductor Multiple-Output Switching Converters, Wing-Hung Ki and Dongsheng Ma; Integrated Power Electronics Laboratory, Department of Electrical and Electronic Engineering, The Hong Kong University of Science and Technology, Clear Water Bay, Hong Kong SAR, China, Jan. 1, 2001, 6 Pages.

Six-Channel Power Supply Supervisor and Cacsade Sequence Controller, Summit Microelectronics, Inc., Jul. 16, 2003, SMS66, Preliminary Information, 26 Pages.

SMBus Controls CPU Voltage Regulators without VID Pins, Mark Gurries, Design Ideas, Linear Technology Magazine, Sep. 1, 2001, 2 Pages.

SMBus VID Voltage Programmers, Linear Technology, Jan. 1, 2001, LTC1699 Series, 20 Pages.

SMH4804, SMP9210 and SMT4004 Telecom Reference Design, Summit Microelectronics, Inc., Sep. 5, 2002, Application Note 25, 17 Pages.

Wide Operating Range, No Sense Step-Down Controller, Linear Technology, Jan. 1, 2001, LTC1778/LTC1778-1, 24 Pages.

Wide Operating Range, No Sense Step-Down DC-DC Controller with SMBus Programming, Linear Technology, Jan. 1, 2001, LTC1909-8, 34 Pages.

"Presenting DALI", AG DALI, 2003, pp. 1-17.

"DALI Manual", DALI AG, Digital Addressable Lighting Interface Activity Group, ZVEI-Division Luminaires, 2001, pp. 1-62.

"Microchip PIC16C781/782 Data Sheet, 8-bit CMOS Microcontrollers with A/D, D/A, OPAMP, Comparators and PSMC", Microchip Technology Inc., 2001, pp. 1-184.

"Microchip AN811, The RS-232/DALI Bridge Interface", Microchip Technology Inc., 2002, DS00811A, pp. 1-8.

"Microchip AN809, Digitally Addressable DALI Dimming Ballast", Microchip Technology Inc., 2002, DS00809B, pp. 1-18.

"The Digital Addressable Lighting Interface (DALI): An Emerging Energy-Conserving Lighting Solution" by Ronat, Odile, International Rectifier, Apr. 9, 2002, TP Apr. 9, 2002, pp. 1-6.

"Microchip AN703, Using the MCP320X 12-Bit Serial A/D Converter with Microchip PICmicro® Devices", Microchip Technology Inc., 2002, DS00703A, pp. 1-25.

"System Management Bus (SMBus) Specification" Version 2.0, Duracell, Inc., Energizer Power Systems, Inc., Fujitsu, Ltd., Intel Corporation, Linear Technology, Inc., Maxim Integrated Products, Mitsubishi Electric Semiconductor Company, PowerSmart, Inc., Toshiba Battery Co. Ltd., Unitrode Corporation, USAR Systems, Inc., Aug. 3, 2000, pp. 1-59.

"Fieldbus System Engineering Guidelines", Fieldbus Foundation, 2003-2004, pp. 1-94.

"Technical Overview, Foundation™ fieldbus, Freedom to Choose. Power to Integrate.", Fieldbus Foundation, 2003, FD-043 Rev 3.0, pp. 1-37.

"Silicon Labs Preliminary Invalidity Contentions", Civil Action No. 2-05-CV-463 (LED)—May 26, 2006 (U.S. District Court Eastern District of Texas).

Microturbine Power Conversion Technology Review, Staunton et al.; Oak Ridge National Laboratory Technical Report; 40 pages.

Microcomputer Control of DC/DC Converters for Photovoltaic Applications, Peracaula et al.; Dept. of Electronics Engineering, Industrial Electronics Group—Technical University of Catalonia, Spain; 4 pgs.

"Automated Power Distribution System Hardware", Anderson et al.; Aug. 6, 1989; pp. 579-584.

"MicroSCADA Technology Rev. 8.4.2 Documentation CD: Application Objects, Chapter 5. Data Objects", CD-ROM; Sep. 18, 1998, ABB, XP002481365; 11 Pages.

"Modern User Interface Revolutionizes Supervisory Systems", D'Armour et al.; IEEE Computer Applications in Power; vol. 7, No. 1; Jan. 1, 1994; pp. 34-39.

"Open Architecture Distributed Processing—The Modern Design for Electric Power Network Automation", Hissey et al.; IEEE Region 9 Colloquium; Sep. 1990; pp. 150-161; XP010038436.

33702 Microprocessor Power Supply (3.0A), Analog Products MC33702 Fact Sheet; Motorola/Digital dna/ Power Management Switching; pp. 1-4, Jan. 1, 2003.

"Electronic Products" Power Supply Special, The Engineer's Magazine of Product Technology, A Hearst Business Publication, vol. 37, No. 10, Mar. 1995, 4 pages.

"KEKB Power Supply Interface Controller Module" by A. Akiyama, T. Nakamura, M. Yoshida, T. Kubo, N. Yamamoto and T. katoh. KEK, High Energy Accelerator Research Organization, 1-1 Ohio, Tsukuba 305, Japan, International Conference on Accelerator and Large Experimental Physics and Control Systems, 1997, Beijing, China, 4 pages.

"Magnet Power Supply Control System in KEKB Accelerators" by T.T. Nakamura, A. Akiyama, T. katoh, Ta. Kubo, N. Yamomoto, M. Yoshida, KEK, Tsukuba, Japan, International Conference on Accelerator and Large Experimental Physics Control Systems, 1999, Trieste, Italy, pp. 406-408.

"Motorola Switch Mode Power Supply With Multiple Linear Regulators And High Speed CAN Transceiver", Motorola, Inc. 2002; digital dna; Analog Marketing; Rev. 2.5, Nov. 2002; 33394; Multi-Output Power Supply Semiconductor Technical Data.

"Power Management Solutions For Networking Applications"; Presented by Luc Darmon, Smart Networks Developer Forum Jun. 4-6, 2003 Euro-Disney Paris, France; Motorola digital dna; motorola.com/sndf; pp. 1-26.

Preliminary Information 1.5 A Switch-Mode Power Supply With Linear Regulator, 33701; Power Supply Integrated Circuit; Motorola Semiconductor Technical Data; Analog Marketing MC33701/D Rev. 1.0, May 2003; Motorola digital dna; pp. 1-24.

"Quantization Resolution and Limit Cycling in Digitally Controlled PWM Converters" by Angel V. Peterchev and A.V. Sanders, Electrical Engineering and Computer Science; UC Berkley; Power Electronics Specialists Conference, 2001. PESC, vol. 2, Jun. 17-21, 2001, pp. 465-471; XP002274573.

"System Management Bus Specification" Smart Battery System Specification, Revision 1.1, Dec. 11, 1998, Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG, All rights reserved, 39 pages.

"The I2C-Bus Specification" Version 2.1, Jan. 2000, Document Order No. 9398 393 40011, pp. 1-46.

"Distributed Intelligence and Modular Architecture for Next Generation DC Power System" by Louis Duguay and Pierre Got, Astec Advanced Power Systems, Quebec, Canada; 6 pgs., Jan. 1, 2000.

"Digitally-Controlled SMPS Extends Power System Capabilities" by Ron Vinsant, John DiFiore, and Richard Clarke, PCIM, Jun. 1994, pp. 30-37.

"Operating and Service Manual", SBC488A, Magna-Power Electronics, Inc., Dec. 19, 2002, 58 pgs.

"Operating and Service Manual", SQ Series, DC Power Supplies, Magna-Power Electronics, Inc., Dec. 16, 2002, 48 pgs.

"Uniform Language for Accessing Power Plants—Human-Machine Language", ANSI T1.317-1993, American National Standards Institute, Dec. 14, 1993, 55 pages.

"An Intelligent, Fault Tolerant, High Power, Distributed Power System for Massively Parallel Processing Computers" by J. Burns, J. Riel and T. DiBene, IEEE, May 1994, 0-7803-1456-5/94, pp. 795-800.

"BE510 / BE510S Modules"—Bipolar DC Source from 100mV to 20V and from 100nA to 4A, Innovative Test Systems; BE510 Version II, Issue 9, Nov. 12, 2000, 3 pgs.

"BE52x Modules"—Multi-range bipolar DC sources from 30V to 500V, 90W, Innovative Test Systems; BE52x Version A, Issue 9, Aug. 3, 2001, 3 pages.

"PCX-150A 150 Amp Pulsed Current Source Operation Manual", Version 3.0, Directed Energy, Inc., 2001, Document No. 9100-0212 R4, 31 pages.

"New Applications Demand Programmable Power Supplies/Sources" by Paul O'Shea, evaluationengineering.com/archive/articles/0997powr.htm, Nelson Publishing, Inc., 1997, 8 pages.

"Market Trends Toward Enhanced Control of Electronic Power Systems" by F.M. Miles, R.K. Danak, T.G. Wilson and G.G. Suranyi, IEEE, 1993, 0-7803-0982-0/93, pp. 92-98.

"R Option, S Option DC Power Supplies", IEEE 488.2/RS-232 Programming Manual, Power Ten, Document No. M550013-01 Rev C, Jun. 25, 2002, 56 pages.

"A Digitally Controlled Zero-Voltage-Switched Fullbridge Converter" by Karl-Heinz Rinne, Klaus Theml, Joseph Duigan and Oliver McCarthy, Power Conversion, Jun. 1994 Proceedings, pp. 317-324.

"vol. 1: Syntax and Style", Standard Commands for Programmable Instruments (SCPI) Consortium, May 1997, Version 1997.0, 68 pages.

"Integrate Internet Solutions Into Your Energy Management Network" by Johan Sarkinen and Ola Lundin, Jun. 1998, 7 pages.

"Automating the Design of a Generic Modular Power System for the Global Market" by George Pedersen, Steve Briggs, and Paul Massey, Advance Power Raynham Road, Bishops Stortford, Herts.; CM23 5PF UK, Jun. 1, 1999.

"An Operation and Maintenance Process Model for Energy Management" by Ola Lundin, Ericsson Components AB, Energy Systems Division, S-164 81 KISTA—Stockholm, Sweden; 7 pages, Jun. 1, 1999.

"Intelligent Platform Management Interface Specification v1.5", Intel, Hewlett-Packard, NEC, Dell, Document Revision 1.1, Feb. 20, 2002, 459 pages.

"vol. 2: Command Reference", SCPI Consortium, May 1997, Version 1997.0, 506 pages.

"vol. 4: Instrument Classes", SCPI Consortium, May 1997, Version 1997.0, 58 pages.

"vol. 1: Syntax and Style", SCPI Consortium, May 1999, Version 1999.0, 67 pages.

"vol. 3: Data Interchange Format", SCPI Consortium, May 1997, Version 1997.0, 73 pages.

"vol. 3: Data Interchange Format", SCPI Consortium, May 1999, Version 1999.0, 72 pages.

"vol. 4: Instrument Classes", SCPI Consortium, May 1999, Version 1999.0, 115 pages.

"Service Guide for Agilent 6610xA Power Modules", Agilent Technologies, Agilent Part No. 5959-3364, Dec. 2002, 101 pages.

"DHP Series DC Power Supplies", IEEE 488.2/RS-232 Options Programming Manual, Sorensen, Division of Elgar Electronics Corporation, Document No. M550005-01 Rev B, Jul. 29, 2002, 32 pages.

"Distributed Power Hot Swap Controller" SMH4804, Summit Microelectronics, Inc., 2050 2.3, Mar. 19, 2001, 32 pages.

"Programmer Manual", PS2520G & PS2521G Programmable Power Supplies, Tektronix, 070-9197-00, 1995, 70 pages.

"User Manual", PS2520, PS2520G, PS2521 & PS2521G Programmable Power Supplies, Tektronix, 070-9196-00, 1995, 56 pages.

"A Power LAN for Telecommunication Power Supply Equipment" by Nicholas Vun C.H., Lau C.T. and Lee B.S., IEEE TENCON '93 Beijing, pp. 24-27.

"Auto Sequence Programming Examples for GPIB-M", Xantrex Technology, Inc., Nov. 27, 2002, 1.0a, 4 pages.

"SCPI Programming Examples for GPIB-M", Xantrex Technology, Inc., Nov. 26, 2002, 1.0, 3 pages.

"Implementing a Nationwide Energy Management System" by Stig Sjöberg, Tommy Hedberg, Lars Selberg and Rober Wikström, Jan. 1, 2000.

"IEEE Standard Codes, Formats, Protocols, and Common Commands for User with IEEE Std 488.1-1987, IEEE Standard Digital Interface for Programmable Instrumentation", IEEE Std 488.2-1992, IEEE, Jun. 18, 1992, ISBN 1-55937-238-9, 254 pages.

"Agilent E3640A-E3649A Programmable dc Power Supplies" Data Sheet, Agilent Technologies, 4 pages, Sep. 11, 2001.

"Agilent E364xA Single Output DC Power Supplies" User's Guide, Agilent Technologies, Part No. E3640-90001, Jan. 2000, 207 pages.

"Optimizing Power Product Usage to Speed Design Validation Testing" Application Note 1434, Agilent Technologies, Nov. 22, 2002, 16 pages.

"vol. 2: Command Reference", SCPI Consortium, May 1999, Version 1999.0, 565 pages.

"Why have Monitoring?" by P. Shawyer, P. Hobbs and A. McLeod, Texcel Technology PLC, United Kingdom, Oct. 14, 2001.

"IMPI Intelligent Platform Management Bus Communications Protocol Specification v1.0", Intel, Hewlett-Packard, NEC, Dell, Document Revision 1.0, Nov. 15, 1999, 39 pages.

"Operating and Service Manual", MQ Series DC Power Supplies, Magna-Power Electronics, Inc., Dec. 19, 2002, 48 pages.

"User's Guide" Series 661xxA MPS Power Modules & Model 66001A MPS Keyboard, Agilent Technologies, Agilent Part No. 5959-3386, Apr. 2000, 53 pages.

"Programming Guide" Series 661xxA MPS Power Modules, Agilent Technologies, Agilent Part No. 5959-3362, Sep. 1997, 114 pages.

"Accelerator-Control-System Interface for Intelligent Power Supplies" by S. Cohen, Los Alamos National Laboratory, pp. 183-186, Aug. 1, 1992.

"Testing Intelligent Power Supplies for the Los Alamos National Laboratory Accelerator Complex" by J.C. Sturrock, S. Cohen, B.L. Weintraub, D.J. Hayden and S.F. Archuletta, Los Alamos National Laboratory, pp. 217-219, Jan. 1, 1992.

"Intelligent Power Supply Controller" by R.S. Rumrill and D.J. Reinagel, IEEE, Aug. 1991, 0-7803-0135-8/91, PAC 1991, pp. 1537-1539.

"Magnet Power Supply as a Network Object" by S. Cohen and R. Stuewe, IEEE, Aug. 1991, 0-7803-0135-8/91, PAC 1991, pp. 929-931.

"Non-Impact Printer Power and Motor Control System on a Chip" by James Masson and Steven Barrow, IEEE, Apr. 1995, IEEE Catalogue No. 95TH8025, 0-7803-2423-4/95, pp. 98-103.

"Power Distribution Systems for Future Homes" by Po-Wa Lee, Yim-Shu Lee and Bo-Tao Lin, IEEE, Aug. 1999, 0-7803-5769-88/99, pp. 1140-1146.

"Installation Guide" MPS Mainframe Model 66000A, Agilent Technologies, Agilent Part No. 66000-90001, Apr. 2000, 26 pages.

"Power System Controller in an Intelligent Telecom Rectifier Plant" by Ueli Roth, IEEE, Aug. 1992, 0-7803-0779-8/92, pp. 476-483.

"The Continuing Evolution of Intelligence for Telecommunications Power Plants" by Jimmy Godby, IEEE, Apr. 1996, 0-7803-3507-4/96, pp. 70-75.

"Digitally Controlled Power Systems: How Much Intelligence is Needed and Where it Should be" by Tom Lock, RELTEC Corporation, 5 pages, Jan. 1, 1998.

"Controlling and Alarming DC Power Plants via the Internet" by Anthony P. Cosentino, Michael C. Sullivan, Richard V. Baxter, Jr. and Jon Loeck, Power Conversion Products, LLC and Pensar Corporation, 6 pages, Oct. 4, 1998.

"Defendant's Artesyn Technologies, Inc.'s Preliminary Invalidity Contentions"—(*Power-One, Inc.* vs. *Artesyn Technologies, Inc.* et al.), Civil Action No. 2-05-CV-463 (LED), United States District Court for the Eastern District of Texas; Apr. 26, 2006.

"Synchronization of Multiple Voltage Regulator Outputs", By M.W. Mueller et al., IBM Technical Disclosure Bulletin, Jun. 1999; (2 pages).

"Power System Controller in an Intelligent Telecom Rectifier Plant," by U. Roth., INTELLEC 1992, pp. 476-483.

Integrity-One: Installation, Operation and Maintenance Manual, Power-One, Inc., 1999-2003 Version 1.2 (P025374-P025559).

VOLTAGE SET POINT CONTROL SCHEME

RELATED APPLICATION DATA

This patent application is a continuation of U.S. patent application Ser. No. 10/388,829, for VOLTAGE SET POINT CONTROL SCHEME, filed Mar. 14, 2003, issued as U.S. Pat. No. 7,080,265 on Jul. 18, 2006.

BACKGROUND OF THE INVENTION

1. Field of the Invention

The present invention relates generally to power regulation systems and, more particularly, to a system and method of determining a voltage output based on programming voltage data received from at least one of a variety of alternate sources.

2. Background of the Invention

Power converters, which are also referred to as Point-of-load ("POL") regulators, voltage regulators or DC/DC converters, are commonly used in conjunction with electronic circuits. This is because the voltage/current requirements of electronic circuits typically differ from the voltage that is readily available or the current that can practically be delivered. For example, some electronic devices only include a single voltage input (e.g., 12 v), but require different voltages for circuits contained within (e.g., 3 v, 5 v, 9 v, etc.). A common solution is to design multiple power converters within the device for converting the single input voltage into multiple voltage levels.

Similarly, some electronic devices include circuits that require low voltage (e.g., 1 v), high current (e.g., 100 A) power supplies. This is problematic in that it is impractical to deliver high current at low voltages over a relatively long distance and still meet desired regulation performances. A common solution is to use a high voltage, low current power supply and design a power converter near the internal circuit. This allows low current to travel throughout the device, and provides a low voltage, high current power supply (i.e., using the power converter) near the internal circuit.

Traditionally, power converters operate in conjunction with a power supply controller ("controller") that activates, programs, and monitors the power converters. Specifically, the controller uses a multi-connection parallel bus (e.g., a six bit parallel bus) to activate and program each power converter. The parallel bus includes an enable/disable bit for turning the power converter on and off and five VID code bits for programming the output voltage of the power converter. The controller further uses additional connections (e.g., three wires) to monitor the voltage/current that is being delivered by each power converter.

The drawback with this type of power converter is that it is only configured to be programmed via a six bit parallel bus. Not only does this limit the type of application in which it can be used, but its adds complexity and size to the overall electronic device.

For example, eighteen connections (i.e., eighteen wires or traces) are needed to program or operate three power converters. Thus, it would be advantageous to have a system and method of programming a power converter that overcame these disadvantages.

SUMMARY OF THE INVENTION

The present invention provides a system and method of determining a voltage output of a programmable power converter based on programming voltage data received from at least one of a variety of alternate sources. Embodiments of the present invention operate in accordance with a programmable power converter including a digital data serial interface ("serial interface"), a digital data parallel interface ("parallel interface"), an analog data interface ("analog interface"), a control unit, and an output voltage builder. In one embodiment of the present invention, the programmable power converter further includes a storage device for storing digital data. In another embodiment of the present invention, the control unit further includes an analog circuit and a processor.

In a preferred embodiment of the present invention, the control unit (or the processor) monitors the serial, parallel and analog interfaces to determine whether programming voltage data has been received. If more than one set of programming voltage data has been received, the control unit determines which set of data takes priority (or is more relevant). For example, in one embodiment of the present invention, data received by the serial interface takes priority over data received by the parallel and analog interface. In another embodiment of the present invention, data received by the parallel interface takes priority over data received by the analog interface. The selected set of programming voltage data is then used (at least in part) to determine an output voltage for the programmable power converter.

In one embodiment of the present invention, at least one of the interfaces includes a communication bus (or wire(s)) capable of receiving, and transmitting to the control unit, a particular format of data. In another embodiment of the present invention, the interface further includes at least one additional component capable of performing a particular operation or function on the received data and providing data (e.g., the resulting data) in response thereto to the control unit. In another embodiment of the present invention, the programming voltage data is received from a programming apparatus (e.g., a resistor network, a plurality of fixed digital values, a processor, etc.).

A more complete understanding of the system and method of determining a voltage output of a programmable power converter will be afforded to those skilled in the art, as well as a realization of additional advantages and objects thereof, by a consideration of the following detailed description of the preferred embodiment. References will be made to the appended sheets of drawings which will first be described briefly.

DETAILED DESCRIPTION

The present invention provides a system and method of determining a voltage output of a programmable power converter based on programming voltage data received from at least one of a variety of alternate sources. In the detailed description that follows, like element numerals are used to describe like elements illustrated in one or more figures.

Figure 1:
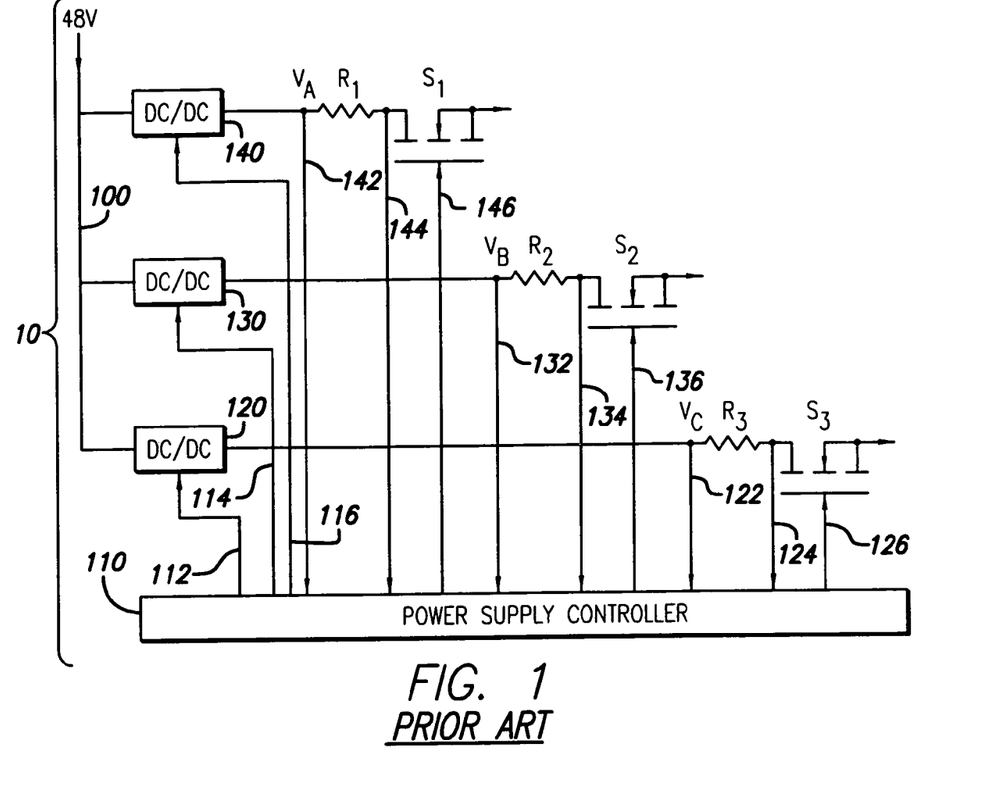
FIG. 1 depicts a prior art power converter system.

FIG. 1 illustrates a prior art power converter system 10 where a power supply controller ("controller") 110 communicates with a plurality of DC/DC power converters (i.e., 120, 130 and 140), also referred to as voltage regulators or point-of-load ("POL") regulators, via a plurality of six bit parallel buses (i.e., 112, 114 and 116) and a plurality of three-wire output connections (i.e., 122-126, 132-136, and 142-146). More particularly, each six bit parallel bus includes an enable/disable bit and five VID code bits, and each three-wire output connection includes a voltage monitoring line (i.e., 122, 132 and 142), a current monitoring line (i.e., 124, 134 and 144), and a switch enable line (i.e., 126, 136, 146).

As shown in FIG. 1, the controller 110 controls the output voltage of each DC/DC power converter by activating, programming, and monitoring the converter via the six bit parallel bus and the three-wire output connection. For example, the controller 110 provides programming voltage data (e.g., output voltage set-point data) to the DC/DC power converter 140 via the VID code portion of the six bit parallel bus 116. The controller 110 then activates the DC/DC power converter 140 via the enable/disable portion of the six bit parallel bus 116. Once activated, the DC/DC power converter 140 converts the voltage provided via the power supply 100 (e.g., 48 v) into an output voltage $V_A$—the magnitude of the output voltage $V_A$ being based on the programming voltage data provided via the VID code portion of the six bit parallel bus 116. The controller 110 then verifies that the output voltage $V_A$ is the desired voltage by measuring the voltage via the voltage monitoring line 142. If the output voltage $V_A$ is acceptable, it is provided to the load (not shown) by activating the switch $S_1$ via the switch enable line 146. The controller 110 can then continuously monitor the output voltage and the output current by measuring the voltage via the voltage monitoring line 142 and measuring the voltage drop over the sense resistor $R_1$ (i.e., the voltage differential between the current monitoring line 144 and the voltage monitoring line 142), respectively. The controller 110 communicates (i.e., programs, activates, monitors) with the remaining DC/DC power converters 120, 130 in the same manner.

The problem with the DC/DC power converters depicted in FIG. 1 (e.g., 140) is that they are only configured to be programmed via a six-bit parallel bus (e.g., 116). Not only does this limit the type of application in which the power converters can be used, but it adds complexity and size to the overall electronic device (not shown) by requiring a six bit parallel bus (i.e., 112, 114 and 116) to operate each power converter. In other words, the controller 110 utilizes eighteen connections (i.e., eighteen wires or traces) in order to communicate with three DC/DC power converters (i.e., 120, 130 and 140).

Figure 2:
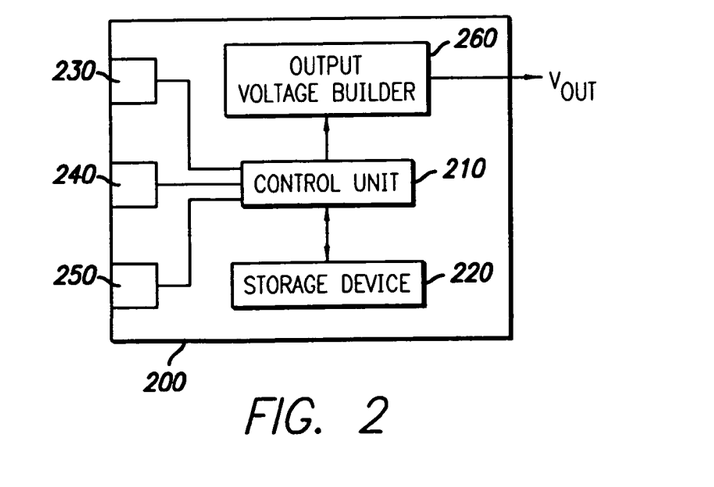
FIG. 2 depicts one embodiment of the programmable power converter provided by the present invention.

FIG. 2 illustrates a programmable power converter 200 operating in accordance with one embodiment of the present invention. Specifically, the power converter 200 includes an output voltage builder 260, control unit 210, a digital data serial interface ("serial interface") 230, a digital data parallel interface ("parallel interface") 250, and an analog data interface ("analog interface") 240. In a preferred embodiment of the present invention, the control unit 210 is adapted to determine an output voltage based upon a set of programming voltage data received by at least one of the connected interfaces (e.g., 230, 240 and 250) and the output voltage builder 260 is adapted to produce the determined output voltage.

It should be appreciated that the programmable power converters depicted herein (e.g., 200) include, but are not limited to, point-of-load regulators, power-on-load regulators, DC/DC converters, voltage regulators, and all other programmable voltage regulating devices (including all single and multiple output devices) generally known to those skilled in the art. It should further be appreciated that the serial, parallel and analog interfaces depicted herein (e.g., 230, 250 and 240) are not limited to a particular type of interface, but instead include all devices (or combinations thereof) that are capable of receiving data in a particular format (e.g., serial, parallel, analog) and providing data (in any format) to the control unit 210 in response thereto. For example, an interface may include a communication bus (or wire(s)) capable of receiving, and transmitting to the control unit 210, a particular format of data. Alternatively, an interface may further include active and/or passive components capable of performing a particular operation on the received data (e.g., latching, buffering, amplifying, trimming, etc.), and providing data in response thereto to the control unit 210. It should further be appreciated that the output voltage builder depicted herein (e.g., 260) includes, but is not limited to, all voltage converting/trimming devices (or circuits) generally known to those skilled in the art. Thus, for example, a multi-stage output voltage builder (e.g., including a fixed or variable voltage reference, an error amplifier, a pulse width modulation controller, a power train, etc.) is within the spirit and scope of the present invention.

In one embodiment, the programmable power converter 200 may further include a storage device 220 for storing programming voltage data and/or look-up table data. For example, if the programming voltage data is received via the serial interface 230, it may be stored in the storage device 220 before it is used to determine the output voltage. Alternatively, if the programming voltage data is received via the parallel interface 230 and represents VID code data, then a look-up table, which could be stored in the storage device 220, is typically used to determine the output voltage. This is because the desired output voltage cannot be ascertained from the VID code value itself without using additional information (e.g., look-up table data). In other words, the VID code value and the look-up table enable the control unit 210 to determine the output voltage. It should be appreciated that the storage device 220 can be a long term or short term storage device, including, but not limited to, registers, RAM, ROM, EPROM, EEPROM, flash memory, and all other digital data storage devices generally known to those skilled in the art.

Figure 3:
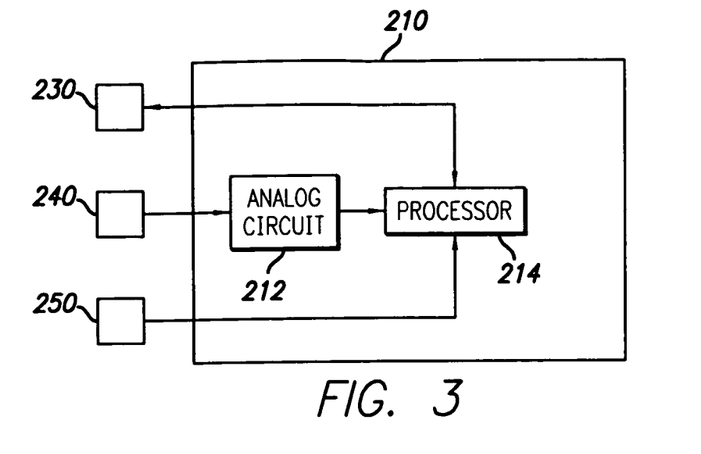
FIG. 3 illustrates one embodiment of the control unit depicted in FIG. 2.

In one embodiment of the present invention, as shown in FIG. 3, the control unit 210 further includes an analog circuit 212 and a processor 214. For example, digital data received via the serial and parallel interfaces 230, 250 may be provided (either directly or indirectly) to the processor 214 (e.g., to the processor's serial or parallel port). On the other hand, analog data received via the analog interface 240 may be provided to the analog circuit 212 for processing (e.g., digital conversion, amplifying, etc.) before it is provided to the processor 214. It should be appreciated, however, that the control unit 210 may not include an analog circuit if the analog processing (e.g., digital conversion, etc.) is performed by the analog interface 240. In this instance, the processed data would then be provided (either directly or indirectly) to the processor 214. It should also be appreciated that the processors depicted herein (e.g., 214) include, but are not limited to, application specific integrated circuits (ASICs), microprocessors, and all other computing devices generally known to those skilled in the art.

Figure 4:
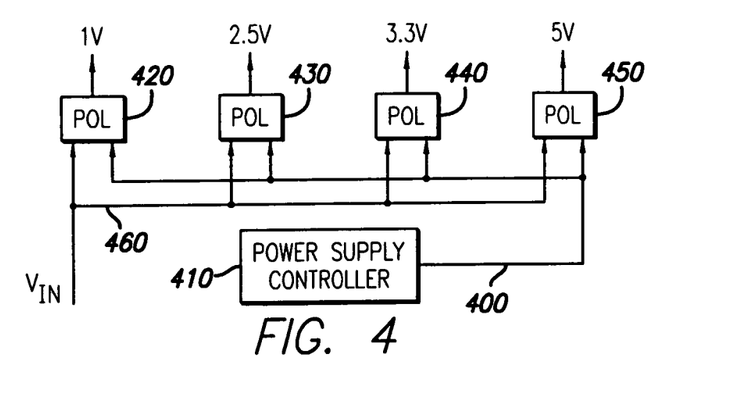
FIG. 4 depicts a programmable power control system operating in accordance with one embodiment of the present invention.

The programmable power converter 200 described herein is capable of being used in a variety of applications (i.e., in a programmable power converter system that includes an analog programming source, a parallel programming source, or a serial programming source). For example, FIG. 4 illustrates a power supply controller 410 communicating with a plurality of programmable power converters (i.e., 420, 430, 440 and 450) via a serial bus 400 to convert an input voltage 460 into a particular output voltage (e.g., 1V, 2.5V, etc.). Methods of using a serial bus to communicate with a programmable power converter, and providing programming voltage data (e.g., output voltage set-point data) over a serial bus are described in more detail in patent applications "SYSTEM AND METHOD FOR CONTROLLING A POINT-OF-LOAD REGULATOR" U.S. Pat. No. 6,949,916 and "SYSTEM AND METHOD FOR COMMUNICATING WITH A VOLTAGE REGULATOR" U.S. Pat. No. 7,049,798, respectively, and are incorporated by reference herein.

Figure 5:
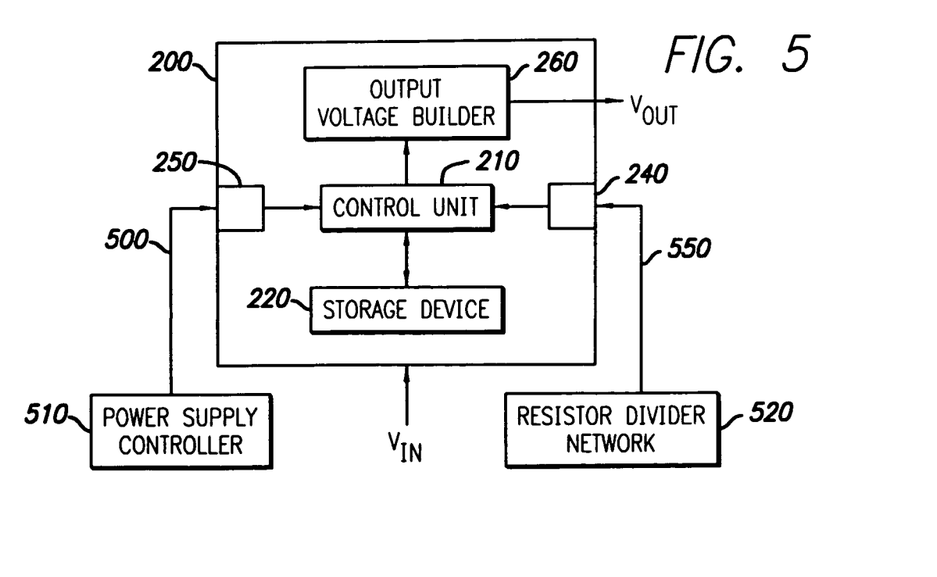
FIG. 5 depicts a programmable power control system operating in accordance with another embodiment of the present invention.

FIG. 5 illustrates how the parallel interface 250 can be used to facilitate communications between the programmable power converter 200 and a power supply controller 510 adapted to transmit digital data in a parallel format. Specifically, programming voltage data in a parallel format (e.g., VID code data) is provided to the programmable power converter 200 via a parallel bus 500 and the parallel interface 250. The programming voltage data (and possibly look-up table data) can then be used by the control unit 210 to determine an output voltage. The determined output voltage is then produced by the output voltage builder 260. It should be appreciated that the present invention is not limited to the use of a power supply controller to provide programming voltage data to the parallel interface 250. For example, hard wiring the parallel bus 500, such that fixed digital data in a parallel format is provided to the parallel interface 250, is within the spirit and scope of the present invention.

FIG. 5 also illustrates how the analog interface 240 can be used to facilitate communications between the programmable power converter 200 and a resistor network 520. Specifically, programming voltage data in an analog format (e.g., a voltage value between zero and five volts) is provided to the programmable power converter 200 via at least one wire 550 and the analog interface 240. The programming voltage data (or the processed result of the programming voltage data) can then be used by the control unit 210 to determine an output voltage. The determined output voltage is then produced by the output voltage builder 260. It should be appreciated that the resistor network depicted herein (i.e., 520) is not limited to a particular type of network. Thus, networks that include fixed-value components (e.g., resistors with fixed values) and/or at least one variable component (e.g., a potentiometer) are within the spirit and scope of the present invention.

Figure 6:
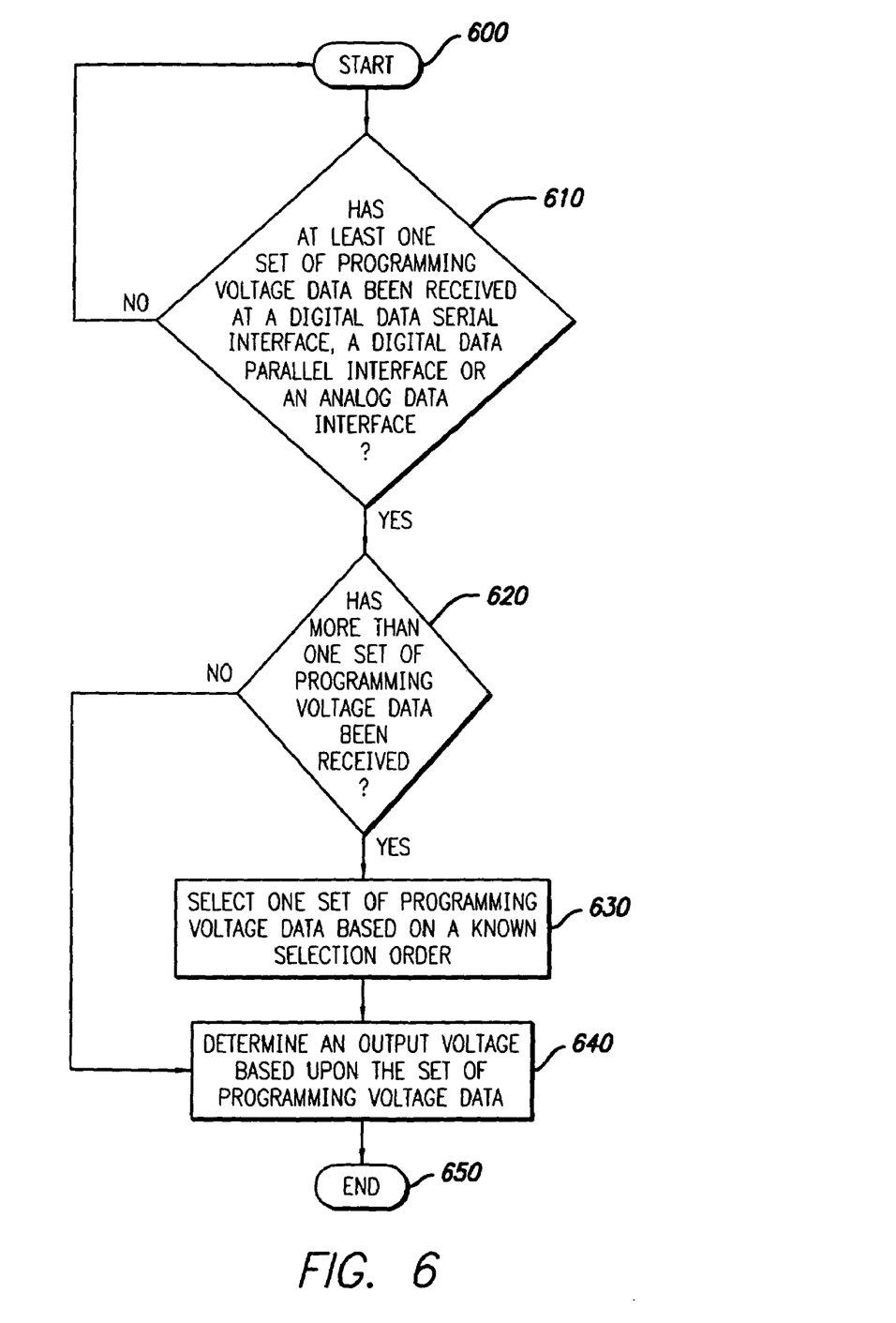
FIG. 6 is a flow chart depicting one method of determining an output voltage based upon a received set of programming voltage data.

One method of using the programmable voltage converter is illustrated in FIG. 6, starting at step 600. Specifically, at step 610, the power converter determines whether programming voltage data has been received at any one of the three interfaces. If programming voltage data has not been received, the process starts over at step 600. Alternatively, if programming voltage data has been received, the power converter, at step 620, determines whether more than one set of programming voltage data has been received. If only one set of programming voltage data has been received (e.g., via the analog interface), an output voltage based (at least in part) on the received set of programming voltage data is determined at step 640. Alternatively, if more than one set of programming voltage data has been received (e.g., via the serial interface and the parallel interface), one set of programming voltage data is then selected (or identified) at step 630. In one embodiment of the present invention, the programming voltage data is selected in accordance with a known priority level, or which data is understood to be more relevant. For example, data received by the serial interface may take priority (or be found more relevant) than data received by the parallel or analog interface. In this embodiment, data received by the serial interface would be selected (or identified) over data received by the parallel or analog interfaces. An output voltage based (at least in part) on the selected set of programming voltage data is determined at step 640, ending the process at step 650.

Having thus described a preferred embodiment of a system and method of determining the voltage output of a programmable power converter based on programming voltage data received from at least one of a variety of alternate sources, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power converter comprising:
 a control unit having at least one digital data interface and at least one analog data interface for receiving first and second sets of programming voltage data, respectively, the control unit (1) determining an output voltage in accordance with the first set of programming voltage data if only said first set of programming voltage data is received by said at least one digital data interface, (2) determining said output voltage in accordance with said second set of programming voltage data if only said second set of programming voltage data is received by said at least one analog data interface, and (3) determining said output voltage in accordance with only one of said first and second sets of programming voltage data if both said first and second sets of programming voltage data are received by said at least one digital data interface and said at least one analog data interface, respectively; and
 a power conversion circuit operatively coupled to the control unit and producing said output voltage;
 wherein, if both said first and second sets of programming voltage data are received by said at least one digital data interface and said at least one analog data interface, the control unit selects only one of said first and second sets of programming voltage data received by the at least one digital data interface and the at least one analog data interface, respectively, in accordance with a predetermined selection order.

2. The power converter of claim 1, further comprising a storage device storing said first set of programming voltage data if said first set of programming voltage data is received from said at least one digital data interface.

3. The power converter of claim 1, further comprising a storage device storing look-up table data, said control unit accessing said look-up table data to determine said output voltage if said first set of programming voltage data is received from said at least one digital data interface.

4. The power converter of claim 1, further comprising a resistor network connected to said at least one analog data interface.

5. The power converter of claim 1, wherein said at least one digital data interface further comprises a digital parallel data interface.

6. The power converter of claim 1, wherein said at least one digital data interface further comprises a digital serial data interface.

7. A power converter comprising:
 a control unit comprising:
  at least one digital data interface;

at least one analog data interface;

an analog control circuit operatively connected to said at least one analog data interface, said analog control circuit converting analog programming voltage data received via said at least one analog data interface into digital programming voltage data; and a digital signal processor connected to said analog control circuit and said at least one digital data interface, said digital processor determining said output voltage from said digital programming voltage data, the control unit determining an output voltage in accordance with programming voltage data received from the at least one digital data interface and the at least one analog data interface; and a power conversion circuit operatively coupled to the control unit and producing said output voltage responsive to the programming voltage data, the control unit prioritizing between programming voltage data received from the at least one digital data interface and the at least one analog data interface.

8. A method of selecting a power converter output, comprising:

receiving at least one of digital programming voltage data via a digital data interface and analog programming voltage data via an analog data interface;

if both digital programming voltage data and analog programming voltage data is received, selecting one of said digital programming voltage data and said analog programming voltage data based on predetermined criteria; and determining an output voltage of a power converter based upon the selected one of said digital programming voltage data and said analog programming voltage data;

wherein said digital programming voltage data further comprises at least one of digital serial programming voltage data and digital parallel programming voltage data, and said selecting further comprises selecting among said digital serial programming voltage data, said digital parallel programming voltage data and said analog programming voltage data.

9. The method of claim 8, wherein said selecting further comprises selecting said digital parallel programming voltage data over said digital serial programming voltage data.

10. The method of claim 8, wherein said selecting further comprises selecting said digital programming voltage data over said analog programming voltage data.

11. The method of claim 8, further comprising storing said digital programming voltage data.

12. A machine-readable medium storing instructions that cause a processing device to perform the functions of:

receiving at least one of digital programming voltage data via a digital data interface and analog programming voltage data via an analog data interface;

if both digital programming voltage data and analog programming voltage data is received, selecting one of said digital programming voltage data and said analog programming voltage data based on predetermined criteria; and determining an output voltage of a power converter based upon the selected one of said digital programming voltage data and said analog programming voltage data;

wherein said digital programming voltage data further comprises at least one of digital serial programming voltage data and digital parallel programming voltage data, and said selecting instruction further comprises selecting among said digital serial programming voltage data, said digital parallel programming voltage data and said analog programming voltage data.

13. The machine-readable medium of claim 12, wherein said selecting instruction further comprises selecting said digital parallel programming voltage data over said digital serial programming voltage data.

14. The machine-readable medium of claim 12, wherein said selecting instruction further comprises selecting said digital programming voltage data over said analog programming voltage data.

15. The machine-readable medium of claim 12, further comprising storing said digital programming voltage data.

* * * * *